United States Patent
Henttonen et al.

(10) Patent No.: US 7,953,399 B2
(45) Date of Patent: May 31, 2011

(54) NETWORK-INITIATED SERVICE CHANGE FROM SPEECH TO MULTIMEDIA

(75) Inventors: Jari Henttonen, Riihimäki (FI); Armi Mensio, Vantaa (FI)

(73) Assignee: Nokia Corporation (FI)

( * ) Notice: Subject to any disclaimer, the term of this patent is extended or adjusted under 35 U.S.C. 154(b) by 0 days.

(21) Appl. No.: 11/150,154

(22) Filed: Jun. 13, 2005

(65) Prior Publication Data

US 2006/0194584 A1 Aug. 31, 2006

Related U.S. Application Data

(60) Provisional application No. 60/656,932, filed on Feb. 28, 2005.

(51) Int. Cl.
*H04M 3/00* (2006.01)

(52) U.S. Cl. .......... 455/418; 455/435.2; 455/552.1; 455/553.1; 455/435.1; 370/384; 370/385; 370/462; 370/354

(58) Field of Classification Search ............ 455/450, 455/67.11, 414.3, 414.4, 422.1, 418, 435.2, 455/552.1, 553.1, 435.1; 370/384, 385, 462, 370/354

See application file for complete search history.

(56) References Cited

U.S. PATENT DOCUMENTS

| 5,757,792 A | 5/1998 | Aoki | |
|---|---|---|---|
| 2003/0096627 A1* | 5/2003 | Rasanen et al. | 455/466 |
| 2004/0028037 A1* | 2/2004 | Rasanen et al. | 370/354 |
| 2004/0132455 A1 | 7/2004 | Stumpert et al. | |
| 2004/0156329 A1 | 8/2004 | Back | |
| 2005/0064821 A1* | 3/2005 | Hedberg et al. | 455/67.11 |

FOREIGN PATENT DOCUMENTS

| EP | 1435748 A1 | 7/2004 |
|---|---|---|
| GB | 2347305 | 8/2000 |
| JP | 9-65425 A | 3/1997 |
| WO | WO 02/19753 A1 | 3/2002 |
| WO | WO 0219753 A1 * | 3/2002 |
| WO | WO 03/032587 A1 | 4/2003 |

OTHER PUBLICATIONS

Austrian search and examination report, Jan. 9, 2009.
Office Action for Russian Application No. 2007135831/09 dated Mar. 5, 2010.
Office Action for Application JP 2007-555727 dated Apr. 5, 2010.
Office Action for Canadian Application No. 2,598,959 dated Jun. 3, 2010.

* cited by examiner

*Primary Examiner* — Ajit Patel
*Assistant Examiner* — Khai M Nguyen
(74) *Attorney, Agent, or Firm* — Alston & Bird LLP (57) ABSTRACT

A method, apparatus and system for initiating a service change in a wireless system, the wireless system including an originating side and a terminating side. The invention includes initiating a modification request in a wireless system, wherein the modification request is a service change from a first mode to a second mode. The invention further includes modifying a terminal from a first mode to a second mode if the modification request is accepted by the terminal, and completing a radio bearer assignment after the modification request is accepted.

27 Claims, 7 Drawing Sheets

NETWORK-INITIATED SERVICE CHANGE FROM SPEECH TO MULTIMEDIA

REFERENCE TO RELATED APPLICATIONS

This application claims priority of U.S. Provisional Patent Application Ser. No. 60/656,932, which was filed on Feb. 28, 2005. The subject matter of this earlier filed application is hereby incorporated by reference.

BACKGROUND OF THE INVENTION

1. Field of the Invention

The present invention relates to the field of wireless communications.

2. Description of the Related Art

There are numerous communication services which carry various forms and combinations of multimedia content such as video, web content, graphics and text. As used in this application, the term "multimedia" refers to any content having a visual element. The mobile terminals of wireless communication networks, particularly phones of cellular networks, are now capable of transporting data, including multimedia data in various communication services. Many types of mobile terminals are being used, such as cellular phones, cordless telephones, personal digital assistants (PDAs), palm-held computers and laptop computers. The strong push in current wireless technology development is to use mobile terminals for varied applications and to allow users of such devices to seamlessly integrate events and needs in their lives while maintaining adequate communications power to receive and transmit all of the data and information which has an impact on them.

An advanced mobile terminal supported by third generation (3G) and fourth generation (4G) networks and using the latest innovations in computers, software, displays and other technologies may access and receive a variety of many different communication services. Unfortunately, the manner and duration (apparent to the user) of the procedure necessary for switching among the communication services may vary widely and unpredictably. These communication services may be provided by different information sources in other networks and may be based on and built upon a variety of data transfer techniques. This introduces more delay and uncertainty into mobile terminal switching among different communication services.

For at least these reasons, present methods of switching between different communication services at a mobile terminal have disadvantages. Accordingly, there is a need for effective solutions that allow for easy and substantially immediate mobile terminal switching between different communication services without it appearing to the user that the connection is broken at any time.

Prior art solutions have not addressed avoiding unnecessary assignment modifications in the originating side or unnecessary interrupts in data traffic if the terminal on the terminating side decides to reject service change from speech to multimedia or if the modification fails for the termination side user equipment.

In addition, if assignment modification in the originating side for the terminal of the originator side would not be started before knowing that a service change in the terminating side user equipment was successful, then unnecessary assignment modification and unnecessary data traffic interrupt could be avoided in originating side.

SUMMARY OF THE INVENTION

The present invention initiates a service change in a wireless network. In an embodiment of the invention includes a method for initiating a service change in a wireless system. The wireless system includes an originating side and a terminating side. The method includes initiating a modification request in a wireless system, wherein the modification request is a service change from a first mode to a second mode. The method further includes modifying a terminal from a first mode to a second mode if the modification request is accepted by the terminal, and completing a radio bearer assignment after the modification request is accepted.

Another exemplary embodiment of the invention is an apparatus for initiating a service change in a wireless system, the wireless system including an originating side and a terminating side. The apparatus includes a switching means for initiating a modification request in a wireless system, wherein the modification request is a service change from a first mode to a second mode. The apparatus further includes a first modifying means for modifying a terminal from a first mode to a second mode if the modification request is accepted by the terminal, and a bearer assignment means for completing a radio bearer assignment after the modification request is accepted.

Another exemplary embodiment of the invention is a system for initiating a service change in a wireless network, the wireless network including an originating side and a terminating side. The system includes a switching module that initiates a modification request in a wireless system, wherein the modification request is a service change from a first mode to a second mode. The system further includes a first modifying module for modifying a terminal from a first mode to a second mode if the modification request is accepted by the terminal, and a bearer assignment module for completing a radio bearer assignment after the modification request is accepted.

DETAILED DESCRIPTION OF THE PREFERRED EMBODIMENT(S)

Figure 1:
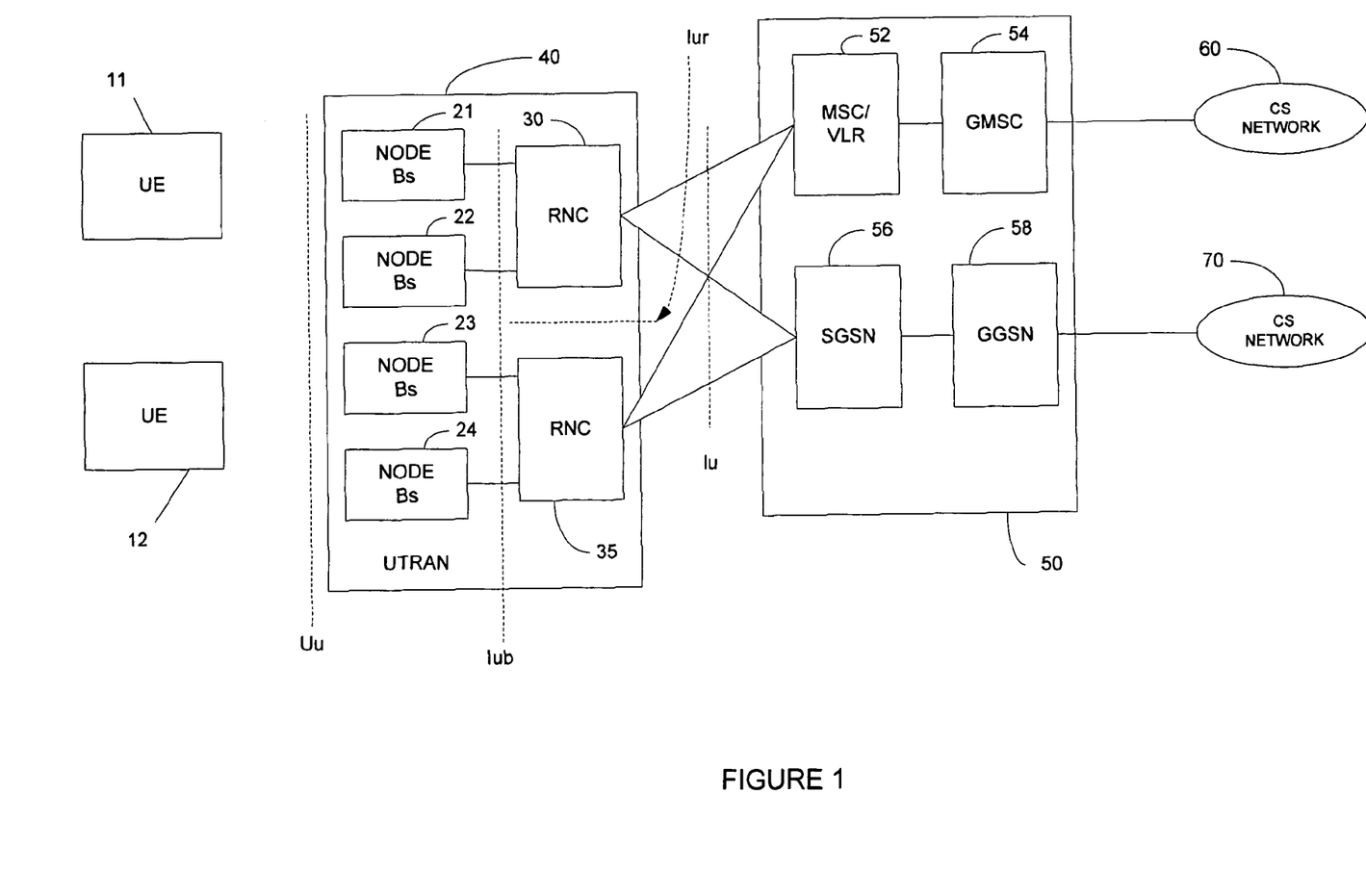
FIG. 1 is a block diagram of an example network architecture according to an example arrangement.

FIG. 1 is a block diagram of an example network architecture according to an example arrangement. FIG. 1 shows first user equipment (UE) 11 and second UE 12 connected via a Uu radio interface to respective first and second node Bs 21, 22 of a Universal Terrestrial Radio Access Network (UTRAN) 40. The node Bs 21, 22 may participate in radio resource management and may have the same function as a generic base station. Furthermore, the UTRAN 40 includes at least one Radio Network Controller (RNC) 30 connected to the node Bs 21, 22 via an interface called Iub and is responsible for the management and the control of the radio resources in its domain (i.e., the node Bs 21, 22 connected to it). The RNC 30 may be a service access point for all services the UTRAN 40 provides to a core network (CN) 50. FIG. 1 also shows an RNC 35 connected to node Bs 23 and 24 via the Iub interface. An interface is provided between the RNC 30 and the RNC 35 called Iur. For ease of illustration, the following discussion will relate to the RNC 30 rather than the RNC 35.

The CN 50 may include a Mobile Switching Centre/Visitor Location Register (MSC/VLR) 52, which is a switch (MSC) and database (VLR) that serves an UE in its current location for circuit switched (CS) services. The MSC function may be used to switch the CS transactions, and the VLR function may maintain information regarding the visiting user's service profile, as well as information on the UE's location within the serving system. The part of the network accessed via the MSC/VLR 52 may be referred to as a CS domain. The MSC/VLR 52 may be connected to a Gateway MSC (GMSC) 54, which is a switch at a point where the CN 50 is connected to external CS networks 60 such as Public Switched Telephone Networks (PSTNs), Integrated Services Digital Networks (ISDNs) or Public Land is Mobile Networks (PLMNs). All incoming and outgoing CS connections go through the GMSC 54.

To achieve multicast transmission between the CN 50 and the UTRAN 40 via the Iu-interface, different characteristics of the multicast related data transmission may be taken into account not only upon active data transmission, but also upon reservation and configuration of the required resources from the Iu-interface. Current 3GPP specifications define signalling protocols such as RANAP (Radio Access Network Application Part) and IuUP (Iu Interface User Plane Protocol). The RANAP is a signalling protocol in the Iu-interface that contains all control information specified for the Radio Network Layer used for UTRAN-related issues. The IuUP also belongs to the Radio Network Layer and has been defined to be as much as possible independent of the CN domain that it is used for. The IuUP may carry user data related to Radio Access Bearers (RABs) over the Iu-interface. Each RAB may have its own instance of the protocol. The protocol may perform either a fully transparent operation, or framing for user data segments and some basic control signalling to be used for initialization and online control. Based on these cases, the IuUP may have two modes, i.e., a transparent mode for fully transparent operation and a support mode for predefined SDU (Service Data Unit) sizes corresponding to framed user data segments.

Each UE willing to receive a multicast service may have an agreement with a service provider or with an operator of the multicast services. Thus, the UEs that are authorized to receive multicast service are configured to receive multicast data over an air interface before the start of an actual multicast session.

The start of the session may begin from a network (NW). For example, a Gateway GPRS Support Node (GGSN) or a MBMS-SC may define the need for a multicast session in a cellular network. From this network device, the need to start the multicast session may be indicated to the SGSN, which initializes activation of the PDP context. Although activation of the PDP context may be transparently made to the UTRAN and UE, services of the RNC may be needed to indicate the multicast service/group status at the multicast cells. The UTRAN may register if the RNC has multicast users. Embodiments of the present invention may provide that multicast user information is provided to the SGSN, which may start the PDP context activation process without requesting any information from the UTRAN.

Either the RNC or the MBMS-SC may decline the activation request for any number of reasons including, but not limited to, a lack of resources for the service or that there is a lack of subscribers of the service found from that part of the network.

A network-initiated service change from speech to multimedia, for example may result in unnecessary RAB Assignment Modifications and also interrupts in data traffic can be avoided if UE-B decides to reject the service change from speech to multimedia or RAB Assignment Modification for UE-B fails.

The present invention, therefore, avoids unnecessary RAB assignment modifications in the originating side, and also avoids unnecessary interrupts in data traffic if user equipment B rejects the service change from speech to multimedia with a MODIFY REJECT message, or if an RAB assignment modification fails for user equipment B.

When the visited MSC of either A or B can longer support an ongoing multimedia call, for example due to degraded coverage conditions, the visited MSC of this party shall initiate a service change from multimedia to speech. If the visited MSC is again able to support the multimedia at a later point in time while the speech call is still ongoing, the same visited MSC may initiate a service change from speech to multimedia, unless it initiated a service change from multimedia to speech before and no other service change was performed in between.

The present invention is described in light of the network-initiated service change, discussed above. The case in which an assignment modification for both users and service change are completed, is described below and illustrated in FIG. 2 which also provides the basis for the descriptions of the remaining Figures.

In addition, FIGS. 2-7 also indicate what are called "Core Network Procedures" for communications between the originating side A and the terminating side B. An example of the core network procedures is described below.

In order to provide the capability in the network to transmit the request, the service change and fallback both at call setup and during the active state of a call, the normal Out-of Band Transcoder Control Procedures is used. The codec to be used is discussed below.

The codec negotiation procedures transmit an ordered list of preferred codecs from the originating to the terminating MSC. A node that requires interaction with the user plane will remove the codecs it does not support. The terminating MSC shall select the codec to use "selected codec" from the list of available codecs for the call. This selection shall be based on the received list of codecs and on the information given by the terminating UE in the CALL confirmed message.

A dummy codec is includes in the codec list to indicate that a multimedia call is requested. Two dummy codes are described below.

The first (dummy code 1) is used for a terminal-initiated service change from speech to multimedia. This codec is in the reference as the 3G-324.M codec. It is supported by any SCUDIF compliant MSC.

The second, (dummy code 2) shall be used for a network-initiated service change from speech to multimedia. This codec is in the present document referred to as the 3G-324.M2 codec. The 3G-324.M2 codec is identical to the 3G-324M codec except for the CoID. It shall be supported by any SCDIF compliant MSC supporting network-initiated service change from speech to multimedia.

The two codecs discussed above are only used by the Core Network and shall not be sent from the terminal in the Supported Codec List IE. The originating MSC has a list of supported codec types listed in order of preference.

If the SETUP message received from the UE contains a Repeat Indicator with a value of service change and fallback in addition to a multimedia BC-IE and a speech BC-IE, the MSC shall include a 3G-324.M codec in the list of supported codec types.

Figure 2:
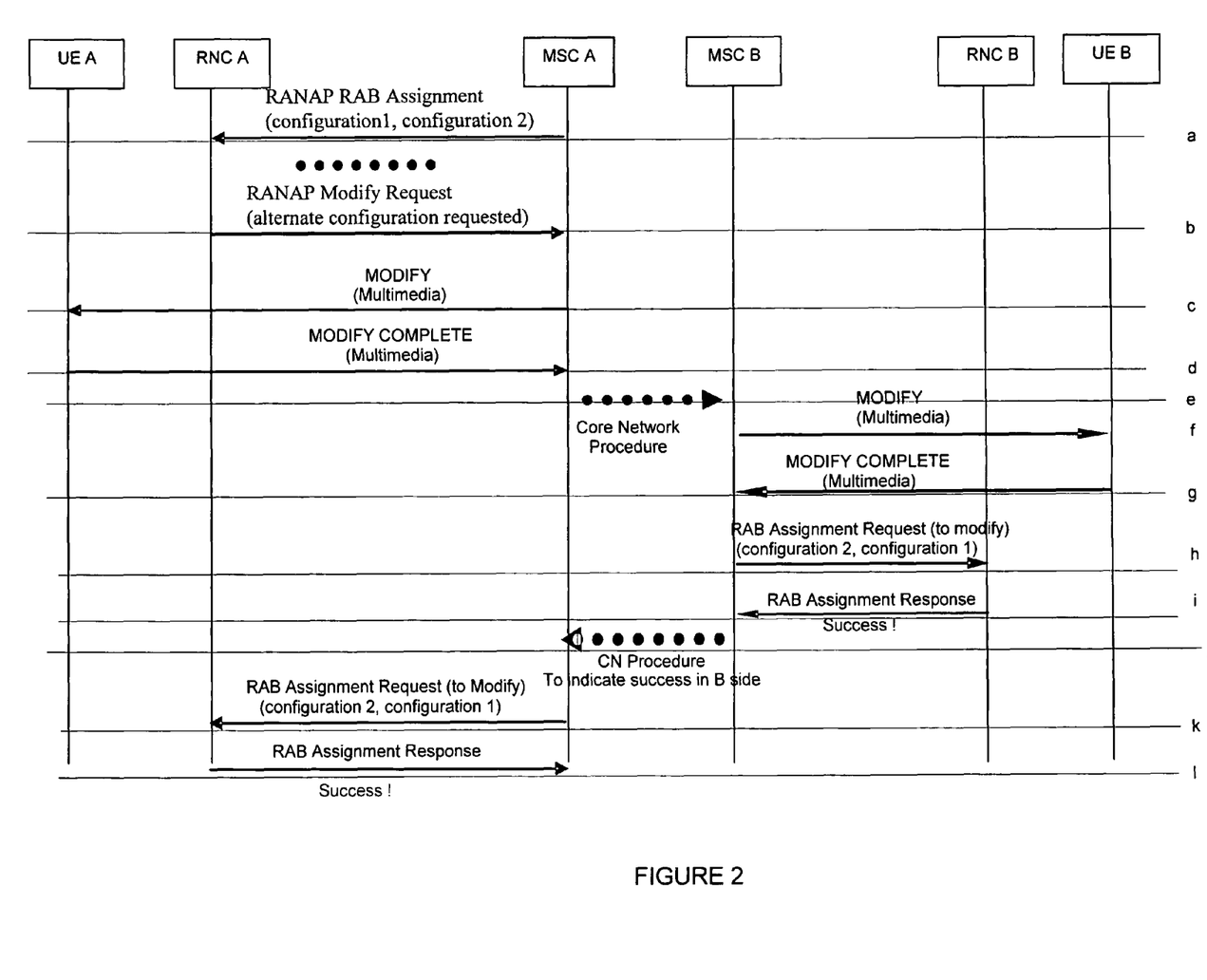
FIG. 2 is flow diagram illustrating an exemplary embodiment of the present invention.

Exemplary embodiments of the present invention are described below. Referring to FIG. 2 and as discussed above, in (a) the configurations (configuration 1 and configuration 2) are previously negotiated during the call setup. This is accomplished by the Mobile service switching center (MSC) of user A (MSC A) which sends the negotiated assignment to the Radio Network Controller (RNC) of user A (RNC A). The service change is requested and the RNC A starts the service change procedure (b).

The service change procedure (b) begins with the Radio Access Network Application Protocol Radio Access Bearer (RANAP RAB) MODIFY REQUEST alternate configuration request being sent from the Radio Network Controller RNC A to MSC A.

At (c) MSC A asks for acceptance of the MODIFY Request by sending a MODIFY message to UE A. At (d) UE A accepts the modification by sending the MODIFY COMPLETE message.

Only after UE A accepts the modification request by sending the MODIFY COMPLETE will the procedure for service change be started on the remote side for UE B.

On the remote side, at (f) the MSC B initiates an In-Call Modification procedure towards the UE B using the MODIFY message. The terminal shall request confirmation from the user unless configured differently. If the change is accepted, UE B replies to the MSC B with a MODIFY COMPLETE message (g) whereas a MODIFY REJECT message shall be sent if the change is rejected.

When receiving a MODIFY message, neither UE A or UE B will interrupt the data traffic and shall continue to send and receive data in the old mode, until the RABs on both sides are reconfigured for the new mode (h)-(i). If the terminal in this example UE B, accepts the modification with a MODIFY COMPLETE message (g), the radio bearer shall send and receive data in the new mode. After both sides accept the service change the RAB Assignment Request is sent from the MSC A to the RNC A at (k). At (l) the RNC A sends an indication that the RAB Assignment is completed If the terminal on either side rejects the service change, the visited MSC shall either clear the call, or it shall initiate a service change procedure towards the other side to revert to the original service. In the present example, a service change procedure is initiated to revert to the original service.

Figure 3:
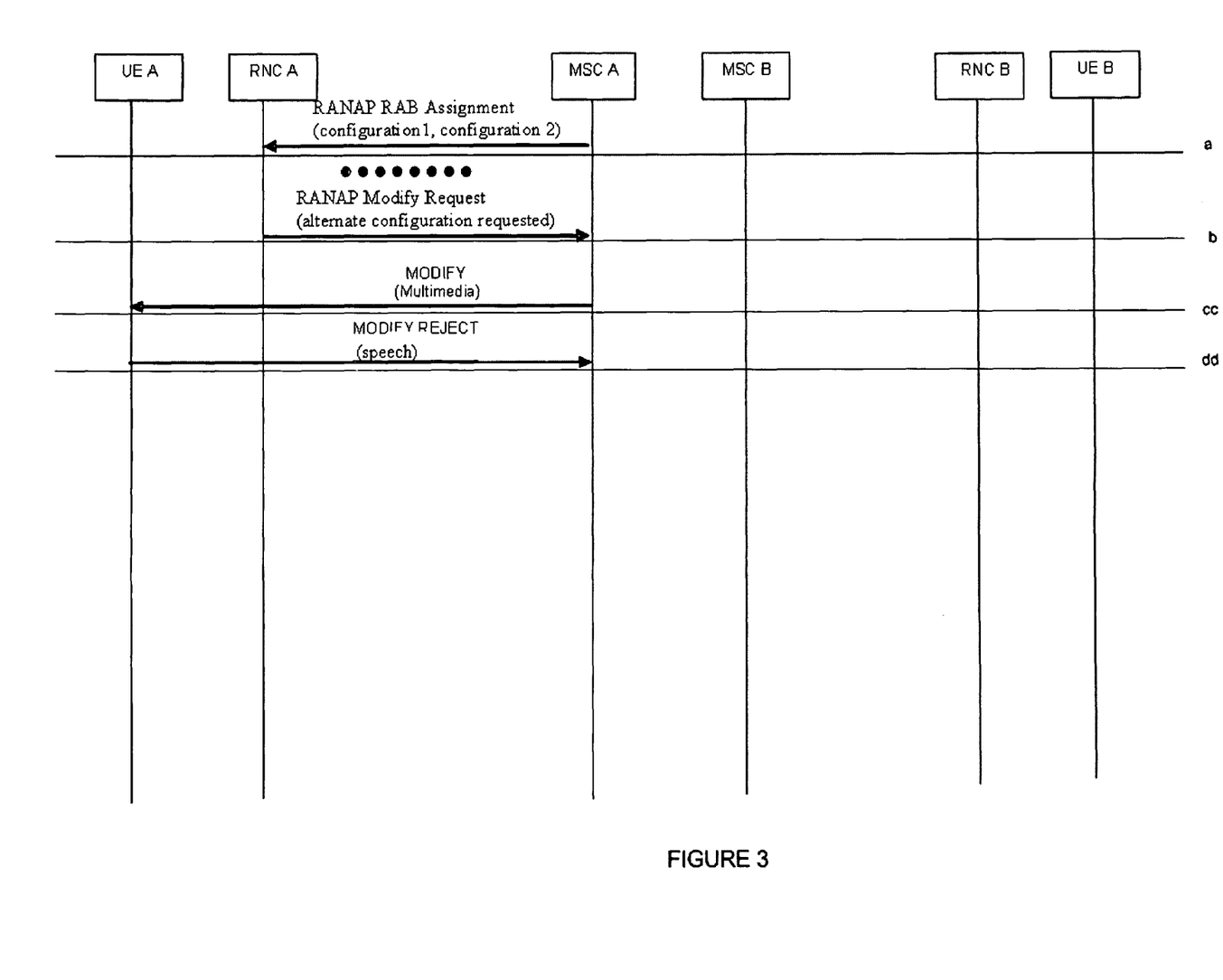
FIG. 3 illustrates the scenario when the originating terminal rejects the service modification.

FIG. 3 illustrates the scenario when the originating terminal rejects the service modification. At (a) and (b), the assignment and request for reconfiguration is the same as that discussed above regarding FIG. 2. However, in this scenario, the UE A rejects the reconfiguration request that was sent from MSC A (d). Because UE A rejected the reconfiguration request, the procedure for starting the service change for the terminating side B has not been started. Therefore, unnecessary RAB Assignment modifications, to both the originating side A and the terminating side B, and unnecessary data traffic interruptions are avoided on the originating side A.

Figure 4:
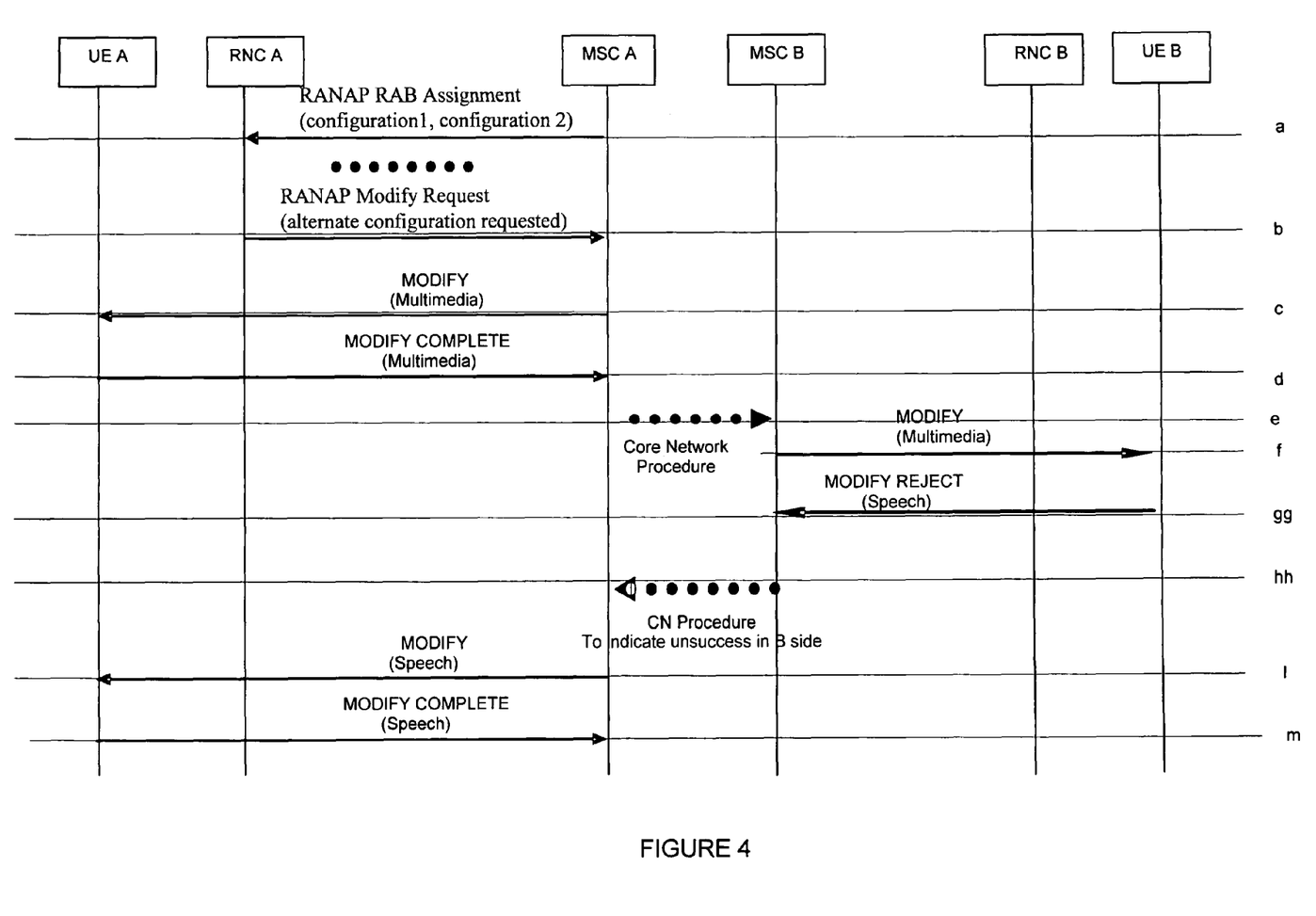
FIG. 4 illustrates the scenario when the terminating side B rejects the service change.

FIG. 4 illustrates the scenario when the terminating side B rejects the service change. According to this example, the service change is rejected by the user UE B. Steps (a) to (f) are the same as described above regarding FIG. 2. However, on the terminating side B, the change is not accepted by UE B and UE B replies to the MSC B with a MODIFY REJECT message (gg).

At (hh) the terminating side indicates that requested service change was unsuccessful on the B side. At this time, MSC A sends a new MODIFY request by sending a MODIFY message to UE A to change the call mode back to speech from multimedia (l) and this request is accepted (m). In this example, although UE B rejected the reconfiguration request, unnecessary RAB Assignment modifications and unnecessary data traffic interruptions are avoided on the originating side A.

Figure 5:
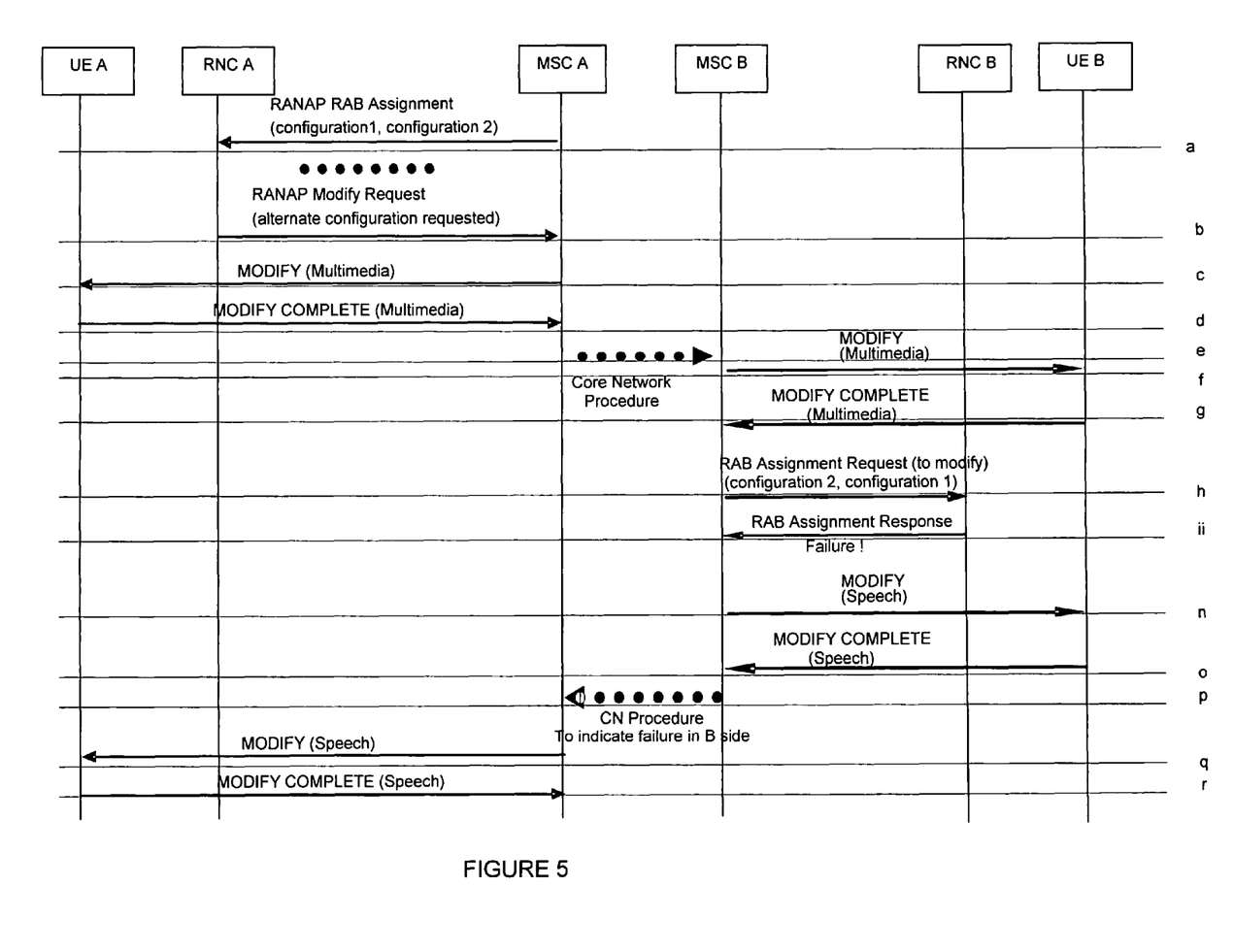
FIG. 5 illustrates the scenario of the RNC of the terminating side rejecting the service request.

FIG. 5 illustrates the scenario of the RNC of the terminating side rejecting the service request, according to an exemplary embodiment of the invention. However the RAB Assignment request is rejected by RNC B. This scenario differs from the one in which the UE B rejects the service change because UE B has converted from speech to multimedia and will have to revert back to speech.

In FIG. 5, steps (a) to (h) are the same as described above regarding FIG. 2. At this time, however UE B has accepted the MODIFY request that was sent and the RAB Assignment process has begun on the B side. As discussed above an RAB Assignment request is sent from MSC B to RNC B at (h). However, according to this example, RNC B has rejected the request, resulting in a failure to modify the RAB assignment (ii).

As a result of the failed attempt at RAB Assignment Modification a new MODIFY message is sent from MSC B to UE B to revert back to the original mode, which in this example, is speech (n)-(o). After UE B has been reverted back to speech, the originator side A is notified of the failed service change on the B side at (p). At this time, UE A reverts back to speech mode from multimedia mode (q)-(r).

Figure 6A:
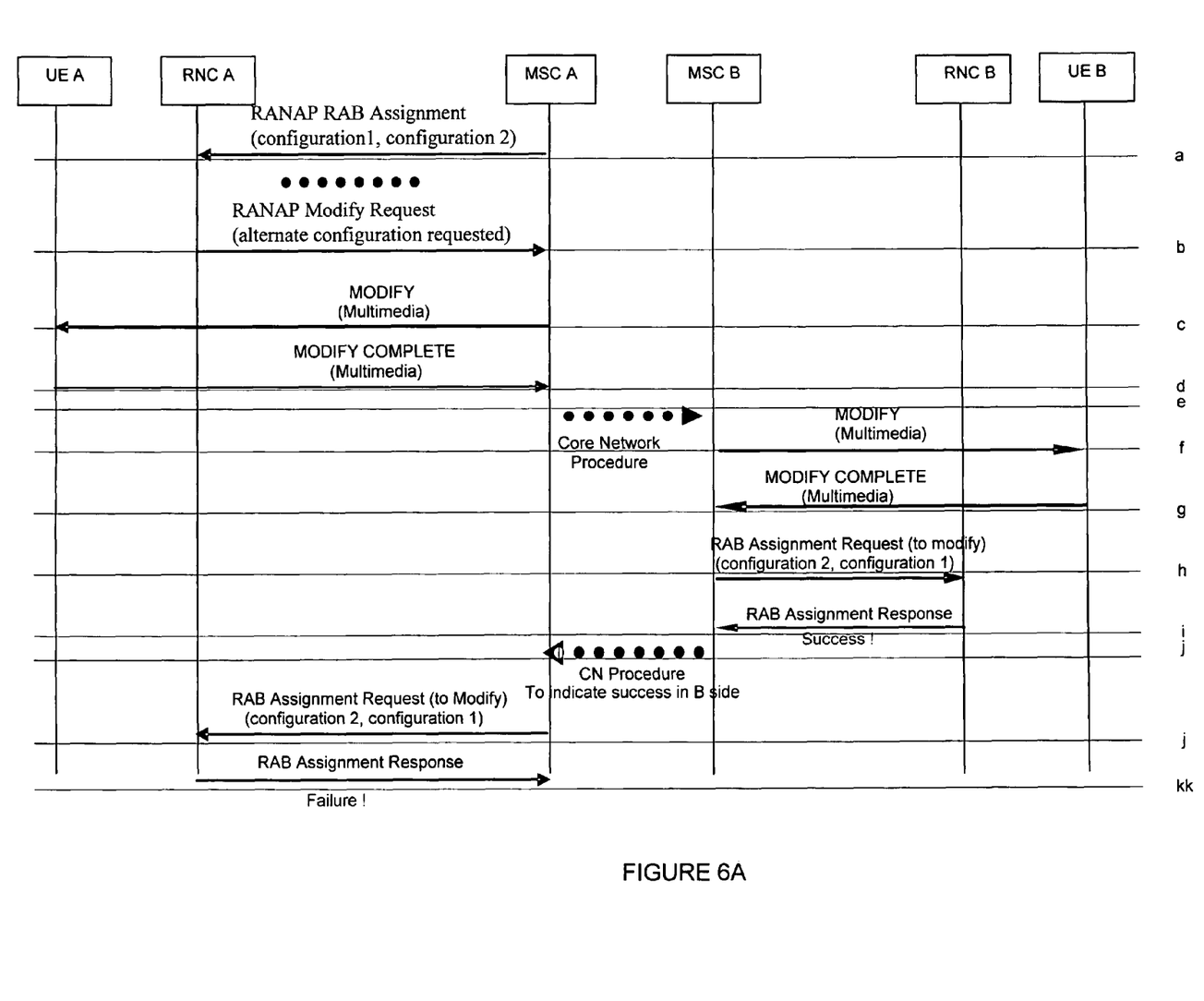
FIGS. 6A-6B illustrate a scenario when the originating side RNC rejects the service change.
Figure 6B:
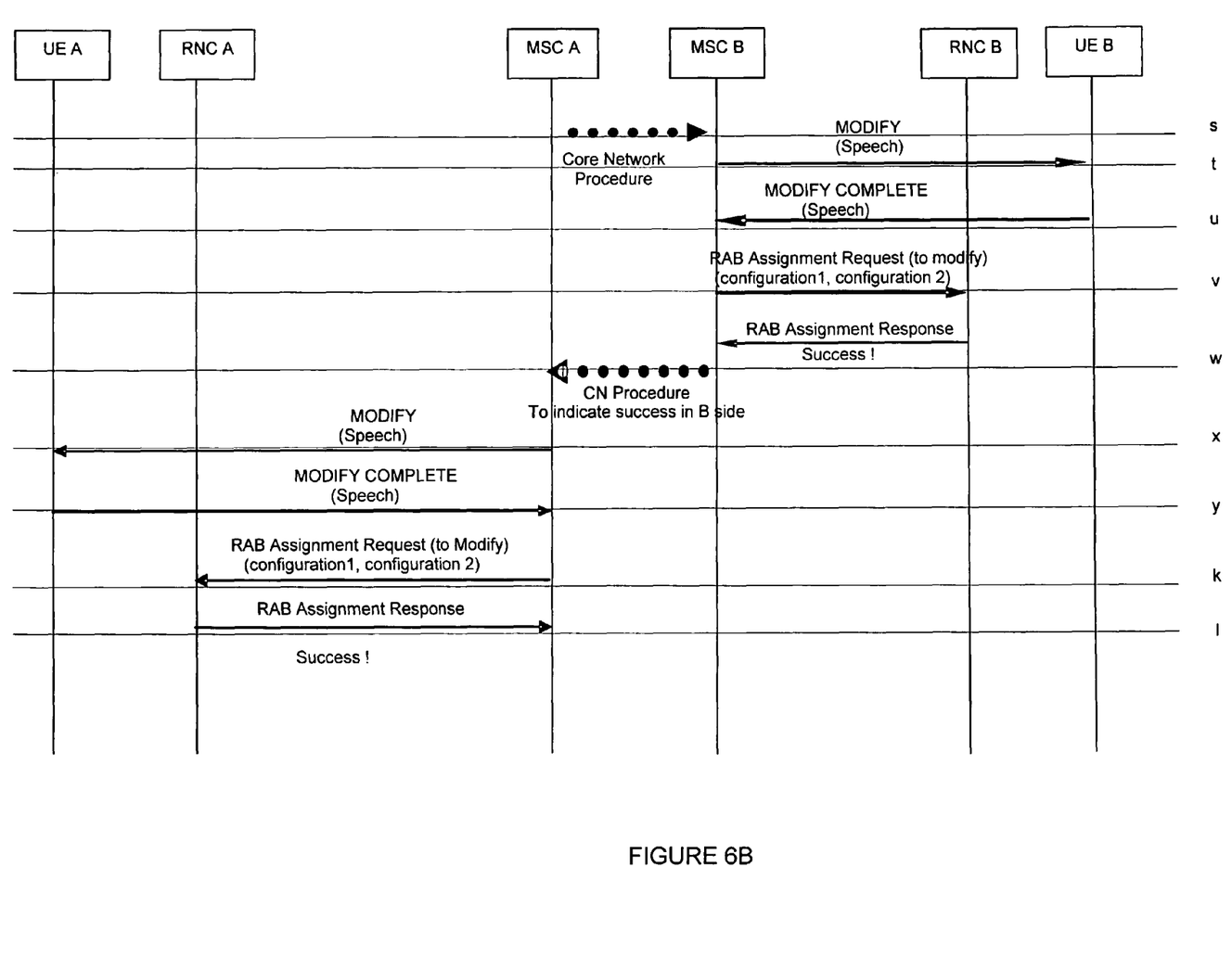

FIGS. 6A-6B illustrates a scenario when the originating side RNC rejects the service change. Steps (a) to (j) are the same as described regarding FIG. 2. As described below, at this point both UE A and UE B have been modified to multimedia from speech. Since the RAB Assignment is now completed for terminating side B, MSC A now sends an RAB Assignment Request message to RNC A (j). For reasons discussed above, the RNC Assignment Request failed and this failure is indicated to MSC A (kk).

At (t) UE B has to be converted back to the original mode, in this case speech, by sending a new MODIFY message. Once this modification is accepted (u), the procedure begins to convert the terminating side B back to speech mode.

A new RAB Assignment Request is sent for side B (v) in response to UE B accepting the modification request in (u). At this time the call mode is converted back to speech after a successful RAB Assignment on the B side (w).

At (x) the core network procedure transmits and indication of the success of the UE B modification and the RAB Assignment on the B side. Note however, that a new RAB Assignment for UE A is not needed because the old resources had not been released. Thus, an unnecessary RAB Assignment for the originating A side is avoided.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. For example, the invention could be implemented as hardware, software, a computer product comprising a computer readable medium, firmware and ASIC, or the like.

The invention claimed is:

1. A method, comprising:
   causing a modification request to be initiated by a core network node of a wireless system, wherein the modification request is a service change from a first mode to a second mode; and
   causing a radio bearer assignment to be completed after the modification request is accepted by a first terminal on an originating side of the wireless system and by a second terminal on a terminating side of the wireless system, wherein
   the initiation of the modification request triggers modification of the first terminal contingent upon acceptance of the modification by the first and second terminals, and wherein the core network node receives an indication of acceptance from the first terminal and the core network node receives an indication of acceptance from a system serving the second terminal.

2. The method of claim 1, wherein:
   the initiating of the modification request comprises initiating the modification request in the originating side of the wireless system.

3. The method of claim 1, wherein:
   the initiating of the modification request comprises initiating the modification request in the originating side of the wireless system, and
   the completing of the radio bearer assignment comprises completing a radio bearer assignment on the originating side when a radio bearer assignment is completed on the terminating side.

4. The method of claim 1, wherein:
   the initiating of the modification request comprises initiating the modification request in the originating side of the wireless system, and
   the completing of the radio bearer assignment further comprises completing a radio bearer assignment on the originating side.

5. An apparatus, comprising:
   initiating means for causing a modification request to be initiated by a core network node, wherein the modification request is a service change from a first mode to a second mode; and
   bearer assignment means for causing a radio bearer assignment to be completed after the modification request is accepted by a first terminal on an originating side of the wireless system and by a second terminal on a terminating side of the wireless system, wherein
   the initiation of the modification request by the initiating means triggers modification of the first terminal contingent upon acceptance of the modification by the first and second terminals, and wherein the core network node receives an indication of acceptance from the first terminal and the core network node receives an indication of acceptance from a system serving the second terminal.

6. The apparatus of claim 5, wherein: the initiating means is configured to initiate the modification request in the originating side of the wireless system.

7. The apparatus of claim 5, wherein:
   the initiating means is configured to initiate the modification request in the originating side of the wireless system, and
   the bearer assignment means is configured to complete a radio bearer assignment on the originating side when a radio bearer assignment is completed on the terminating side.

8. The apparatus of claim 5, wherein:
   the initiating means is configured to initiate the modification request from the first mode to the second mode in the originating side of the wireless system, and
   the bearer assignment means is configured to complete a radio bearer assignment of the originating side.

9. An apparatus comprising: at least one processor and at least one memory including computer program code, the at least one memory and the computer program code configured to, with the at least one processor, direct the apparatus at least to:
   cause a modification request to be initiated by a core network node of a wireless system, wherein the modification request is a service change from a first mode to a second mode, and
   cause a radio bearer assignment to be requested after the modification request is accepted by a first terminal on an originating side of the wireless system and a second terminal on a terminating side of the wireless system, wherein
   the initiation of the modification request by the core network node triggers modification of the first terminal contingent upon acceptance of the modification by the first and second terminals, and wherein the core network node receives an indication of acceptance from the first terminal and the core network node receives an indication of acceptance from a system serving the second terminal.

10. The apparatus of claim 9, wherein the apparatus is further caused to initiate the modification request in the originating side of the wireless system.

11. The apparatus of claim 9, wherein the apparatus is further caused to:
    initiate the modification request in the originating side of the wireless system, and
    complete a radio bearer assignment on the originating side when a radio bearer assignment is completed on the terminating side.

12. The apparatus of claim 9, wherein the apparatus is further caused to:
    initiate the modification request from the first mode to the second mode in the originating side of the wireless system, and
    complete a radio bearer assignment of the originating side.

13. An apparatus, comprising:
    a receiver configured to receive, from a network of a wireless system at a core network node, a modification request from a first mode to a second mode in an originating side of the wireless system;
    a transmitter configured to request acceptance of the modification request from a first terminal on the originating side of the wireless system and to notify a terminating side of the wireless system of the originating side accepting the modification request when the modification request is accepted by the first terminal; and
    a processor configured to verify whether a second terminal on the terminating side has accepted the modification request, wherein
    the receiver is further configured to receive an indication of acceptance from the first terminal and an indication of acceptance from a system serving the second terminal and receive a notification that a bearer assignment is complete after the first terminal and the second terminal accept the modification request.

14. The apparatus of claim 13, wherein the transmitter is further configured to transmit a radio bearer assignment request after the first terminal and the second terminal accept the modification request.

15. A computer product comprising a non-transitory computer-readable medium having software stored thereon, the software configured to control a processor to perform a process, the process comprising:
   initiating a modification request by a core network node of a wireless system, wherein the modification request is a service change from a first mode to a second mode; and
   completing a radio bearer assignment after the modification request is accepted by a first terminal on an originating side of the wireless system and by a second terminal on a terminating side of the wireless system, wherein
   the initiation of the modification request triggers modification of the first terminal contingent upon acceptance of the modification by the first and second terminals, and wherein the core network node receives an indication of acceptance from the first terminal and the core network node receives an indication of acceptance from a system serving the second terminal.

16. The computer product of claim 15, wherein: the initiating of the modification request comprises initiating the modification request in the originating side of the wireless system.

17. The computer product of claim 15, wherein:
   the initiating of the modification request comprises initiating the modification request in the originating side of the wireless system, and
   the completing of the radio bearer assignment comprises completing a radio bearer assignment on the originating side when a radio bearer assignment is completed on the terminating side.

18. The computer product of claim 15, wherein:
   the initiating of the modification request comprises initiating the modification request in the originating side of the wireless system, and
   the completing of the radio bearer assignment further comprises completing a radio bearer assignment on the originating side.

19. An apparatus comprising at least one processor and at least one memory including computer program code, the at least one memory and the computer program code configured to, with the at least one processor, direct the apparatus at least to:
   receive, from a network of a wireless system at a core network node, a modification request from a first mode to a second mode in an originating side of the wireless system;
   cause acceptance of the modification request from a first terminal to be requested;
   cause a terminating side of the originating side accepting the modification request to be notified when the modification request is accepted by the first terminal;
   verify whether a second terminal has accepted the modification request;
   receive an indication of acceptance from the first terminal and an indication of acceptance from a system serving the second terminal; and
   receive a notification that a bearer assignment is complete after the first terminal and the second terminal accept the modification request.

20. The apparatus of claim 19, wherein the apparatus directed to receive the modification request includes being directed to receive the modification request, the modification request originating from a core network entity.

21. The apparatus of claim 19, wherein the apparatus directed to receive the modification request includes being directed to receive the modification request, the modification request originating from a mobile switching center.

22. A method, comprising:
   receiving, from a network of a wireless system at a core network node, a modification request from a first mode to a second mode in an originating side of the wireless system;
   causing acceptance of the modification request from a first terminal to be requested;
   causing a terminating side of the originating side accepting the modification request to be notified when the modification request is accepted by the first terminal; and
   verifying whether a second terminal has accepted the modification request, wherein the receiving further comprises receiving an indication of acceptance from the first terminal and an indication of acceptance from a system serving the second terminal and receiving a notification that a bearer assignment is complete after the first terminal and the second terminal accept the modification request.

23. The method of claim 22, further comprising:
   causing transmission of a radio bearer assignment request after the first terminal and the second terminal accept the modification request.

24. The method of claim 22, wherein receiving the modification request includes receiving the modification request, the modification request originating from a core network entity.

25. The method of claim 22, wherein receiving the modification request includes receiving the modification request, the modification request originating from a mobile switching center.

26. A computer product comprising a non-transitory computer readable medium having a computer program stored thereon, the program configured to control a processor to perform a process, the process comprising:
   receiving, from a network of a wireless system at a core network node, a modification request from a first mode to a second mode in an originating side of the wireless system;
   causing acceptance of the modification request from a first terminal to be requested;
   causing a terminating side of the originating side accepting the modification request to be notified when the modification request is accepted by the first terminal; and
   verifying whether a second terminal has accepted the modification request,
   wherein the receiving further comprises receiving an indication of acceptance from the first terminal and an indication of acceptance from a system serving the second terminal and receiving a notification that a bearer assignment is complete after the first terminal and the second terminal accept the modification request.

27. The computer program product of claim 26, the process further comprising:
   causing transmission of a radio bearer assignment request after the first terminal and the second terminal accept the modification request.

* * * * *

UNITED STATES PATENT AND TRADEMARK OFFICE
CERTIFICATE OF CORRECTION

PATENT NO.        : 7,953,399 B2                                        Page 1 of 1
APPLICATION NO.   : 11/150154
DATED             : May 31, 2011
INVENTOR(S)       : Henttonen et al.

It is certified that error appears in the above-identified patent and that said Letters Patent is hereby corrected as shown below:

Column 3
Line 36, "IuUP" should read --IuUp--.

Signed and Sealed this
Eighteenth Day of September, 2012

David J. Kappos
*Director of the United States Patent and Trademark Office*